United States Patent [19]

Perman

[11] Patent Number: 5,071,587

[45] Date of Patent: Dec. 10, 1991

[54] COMPOSITION AND METHOD FOR PURIFYING WATER

[75] Inventor: Craig A. Perman, Woodbury, Minn.

[73] Assignee: AquaTechnica, Inc., Woodbury, Minn.

[21] Appl. No.: 531,346

[22] Filed: May 31, 1990

[51] Int. Cl.$^5$ .............................. C02F 1/52; C02F 5/10
[52] U.S. Cl. .................................... 252/181; 252/175; 252/180; 210/730; 210/679; 502/68; 502/514
[58] Field of Search ............... 210/702, 714, 723, 724, 210/725, 728, 729, 732–736, 679, 691, 694, 753, 754, 764; 252/175, 180, 181; 502/62, 63, 64, 67, 68, 72, 402, 514; 106/15.05, 18.35, 18.32

[56] References Cited

U.S. PATENT DOCUMENTS

| | | | |
|---|---|---|---|
| 1,793,670 | 2/1931 | Borrowman . | |
| 2,004,257 | 6/1935 | Tschirner . | |
| 2,345,827 | 4/1944 | Olin . | |
| 3,046,233 | 7/1962 | Levy | 210/723 |
| 3,066,095 | 11/1962 | Hronas | 210/728 |
| 3,130,167 | 4/1964 | Green . | |
| 3,338,828 | 8/1967 | Clark . | |
| 3,342,742 | 9/1967 | Cocks . | |
| 3,350,304 | 10/1967 | Bacon . | |
| 3,388,060 | 6/1968 | Clark . | |
| 3,524,811 | 8/1970 | Tsuk et al. . | |
| 3,860,526 | 1/1975 | Corbett | 252/181 |
| 3,953,330 | 4/1976 | Tonkyn et al. | 210/728 |
| 4,116,828 | 9/1978 | Sawyer, Jr. . | |
| 4,332,693 | 6/1982 | Piepho . | |
| 4,415,467 | 11/1983 | Piepho . | |
| 4,440,867 | 4/1984 | Sabberwal | 210/660 |
| 4,450,092 | 5/1984 | Huang . | |
| 4,530,765 | 7/1985 | Sabberwal et al. | 210/687 |
| 4,610,801 | 9/1986 | Matthews et al. . | |
| 4,746,457 | 5/1988 | Hassick et al. . | |
| 4,765,908 | 8/1988 | Monick et al. | 210/728 |

OTHER PUBLICATIONS

A. M. Thayer, "Water Treatment Chemicals: Tighter Rules Drive Demand", C&EN, Mar. 26, 1990, pp. 17–34.

*Primary Examiner*—Stanley S. Silverman
*Assistant Examiner*—Neil M. McCarthy
*Attorney, Agent, or Firm*—Bacon & Thomas

[57] ABSTRACT

The present invention provides a composition in dry form, preferably in the form of a tablet, containing a combination of ingredients which upon addition to contaminated water effectively removes turbidity, metal and organic contaminants in the water and thereby makes the water safer for drinking. The composition is particularly useful for personal use so that safe drinking water can be obtained by the simple addition of the composition to the water to remove the turbidity and contaminating materials contained therein. Preferably the composition contains bentonite clay, attapulgite clay, polymeric coagulant and/or flocculent, biocide, zeolite and activated charcoal. The invention also provides a method for treating water with the composition as well as a method for making the composition.

27 Claims, No Drawings

COMPOSITION AND METHOD FOR PURIFYING WATER

BACKGROUND OF THE INVENTION

1. Field of the Invention

The present invention relates to compositions which are useful for purifying turbid and/or polluted water to clarify and make such water suitable for drinking. In particular, the present invention is directed toward a formulation and use thereof which is advantageously formulated for purifying small quantities of water for personal use, such as would be necessary in emergency situations encountered by campers, military personnel and other who find themselves in a situation where the only drinking water available is contaminated with turbidity causing materials and other pollutants.

2. Background of the Invention

Various types of water purification ingredients are known for removing particular types of pollutants from water. Typically, such ingredients are utilized in large scale water purification facilities to remove specific pollutants encountered in a particular source of water. For example, flocculants or coagulants are known to be useful for removing particulate contaminants found in some sources of water before such water can be discharged into a lake or stream. Likewise, various types of adsorbants are available for removing certain types of pollutants.

Typical procedures for using conventional water purification chemicals require operation under carefully controlled conditions and generally involve operation of expensive equipment which can be complicated to operate. The useful chemicals for purifying the water are generally not combined with each other since they typically require conditions during the purification process which may not be suitable for the other ingredients. Thus, many operations require sequential use of each ingredient as needed and the physical conditions for each sequential step are adapted to meet the functional or physical limitations of each ingredient.

In some instances a combination of ingredients has been formulated into a single composition. However, the combination of ingredients in these compositions is very limited and such compositions are often in a physical form which makes them unsuitable for convenient use under typical field conditions encountered by campers, military personnel, etc. Furthermore, such compositions are not complete for purifying water and they thus require additional materials and process steps for acceptable clarification and removal of pollutants. In addition, such compositions often require a long processing time which is impractical for certain applications, especially military applications where the need to quickly provide potable water may be critical.

In order for a water purification composition to be suitable for field applications in which water can be clarified and made pollutant free, such a composition should be effective in a small quantity, have a long shelf life and be in a solid dry form for easy packaging and convenient use and operable under a wide range of environmental conditions. More importantly, such a composition should contain all of the effective ingredients in a single composition and such ingredients should be formulated in a manner so that they do not interfere with one another. In addition, the individual ingredients should be quickly dispersible when placed into water so that the composition is quickly activated. It is also very important that the composition can purify and clarify the water quickly.

Prior art compositions have never contained all of the essential ingredients in a single composition for water purification because of certain obstacles associated with making such a combination of ingredients. In particular, it has never been possible to combine all of the essential ingredients in a single composition because the individual ingredients tend to interfere with one another when blended together. Also, from a theoretical point of view, the chemical characteristics of the individual ingredients suggests that such a combination would not be possible if you expect each ingredient to function without interfering with each other in purifying the water.

Currently nothing exists on the market for manual purification except for $I_2$ tablets which are only effective as a biocide. These tablets do not clarify or sorb metals or organics unless filters or other mechanical devices are employed. Even then broad range pollutant removal is incomplete.

U.S. Pat. No. 2,345,827 (Olin) teaches clarification of water using bentonite clay. The clay must first be formed into a slurry with water and then the slurry is added to the water to be purified. When forming the slurry, care must be taken to avoid ionizing substances or coagulants. Thus, Olin teaches against incorporating a coagulant into the slurry. Small amounts of ionizing substances or coagulants are tolerated for forming the slurry, but the amount is limited to an amount normally found in water. In rare instances, where insufficient ionizable substances are found in water being purified, then these substances may be added to the water being purified, either before or after addition of bentonite slurry to the water. However, the coagulants or ionizing substances must not be added to the bentonite slurry before it is added to the water. Thus, Olin goes to great lengths to avoid combining a coagulant with the clay in a single composition which is to be added to the water. Thus, Olin fails to provide a complete composition for purifying the water. Furthermore, Olin's slurry is inconvenient to use in the field.

U.S. Pat. No. 3,524,811 (Tsuk) discloses the use of certain polymeric flocculants to promote settling of solids suspended in water. Tsuk emphasizes that when two treating agents are combined, they are formulated into an acid solution having a pH below 3. Such a harsh pH would be expected to interfere with zeolites which require a pH of 6–11. Thus, Tsuk's composition effectively precludes the use of zeolites therein. Furthermore, Tsuk does not provide a convenient dry formulation which could quickly remove all of the pollutants from water.

It has been noted by Bacon in U.S. Pat. No. 3,350,304 that bentonite, especially expandable or swellable bentonite should be avoided in a coagulant composition which is used for flocculating finely divided solids in water. Bacon observes that bentonites are associated with an undesirable carry-over of colloidal material into the filter bed.

Bentonite clay has been combined with polymeric flocculants in the composition described in U.S. Pat. Nos. 3,388,060 (Clark); 3,338,828 (Clark); 3,130,167 (Green); 4,415,467 (Piepho); 4,332,693 (Piepho); and 4,765,908 (Monick). However, none of these compositions have overcome the problems associated with a complete combination of essential water purification ingredients and thus these compositions fail to provide a single formulation having the characteristics described above which are necessary for personal water purification in the field. In particular, none of these patents use attapulgite clay and zeolite to clarify and remove pollutants from water in a single composition. Furthermore, none of these patents include a biocide which is compatible with the other ingredients.

Attapulgite clay is known for use in water purification procedures. For example, U.S. Pat. No. 4,116,828 (Sawyer) discloses a water purification method which uses attapulgite clay and sepiolite. However, the clay does not result in clarification and, in fact, it contributes to turbidity. Consequently, cumbersome sedimentation and/or filtration techniques must be employed to remove the clay or sepiolite from the water.

Attapulgite clay is used in a coagulating agent described by Cocks in U.S. Pat. No. 3,342,742. Cocks uses the attapulgite clay and a nucleating agent which is impregnated in an alkali metal aluminate coagulant. Thus, the clay, being impregnated in the coagulant, cannot be freely dispersed in the water for effective removal of contaminants.

Zeolites have been described for use in water purification in U.S. Pat. Nos. 1,793,670 (Borrowman) and 2,004,257 (Tschirner). However, neither of these patents suggest how the zeolite can be combined with other essential ingredients to form a complete water purification composition wherein the numerous ingredients do not interfere with each other.

U.S. Pat. Nos. 3,860,526 (Corbett); 4,450,092 (Huang); 4,610,801 (Matthews); and 4,746,457 (Hassick) describe various types of materials which are suitable for treating water. An article published in Chemical & Engineering News entitled "Water Treatment Chemicals: Tighter Controls Drive Demand"; Mar. 26, 1990, use an overview of chemical technology involved in water purification. However, these references also fail to disclose a single convenient composition having all the necessary ingredients for making polluted water suitable for drinking and which can be quickly used in the field.

It is also known to use a biocide in water treating compositions to kill germs. However, bentonite and attapulgite clay contain water of hydration which is known to interact with biocidal materials such as chlorine dioxide. For example, a well known biocidal material is available which contains chlorine dioxide stabilized on diatomaceous earth. This biocide would ordinarily be considered to be an excellent biocide for use in drinking water because no toxic by-products exist after hydrolysis in water. However, even though bentonite is capable of removing diatomaceous earth, contact with the bentonite liberates chlorine dioxide even in dry formulations. The liberated chlorine dioxide would degrade organic flocculants and coagulants. Furthermore, the biocide will be spent prior to use thus giving the composition a short shelf life. For these reasons, effective compatible biocides have not been formulated with a single complete water treating composition which has a long shelf life which does not produce products which are toxic to humans.

Chlorine and iodine releasing biocides are also avoided in complete water treating formulations because chlorine and iodine ions readily react with a wide variety of organic compounds. Thus, these ions are avoided in compositions containing polymeric flocculants since the latter would be expected to become inactive in the presence of chlorine or iodine ions.

Clays also present certain problems with respect to compatibility with other ingredients. For example, bentonite clay and attapulgite clay are known to have exchangeable cations (Mg, Ca and $NH_4^{30}$) in their lattice structure. These ions would be expected to interfere with the proper functioning of zeolite, if zeolite is added to remove toxic metals and the like from the water. Also, since bentonite and attapulgite clays both develop negative charges, it would be expected that the bentonite would not function to remove the attapulgite clay from the solution because of expected repulsive forces between the two like-charged materials. Furthermore, attapulgite clay is known to be a powerful sorbant of polar organic materials due to its fine particle size and porosity. Thus, it would be expected that attapulgite would effectively sorb organic polymers such as organic flocculants and coagulants and thereby render them inactive. Thus, one would avoid combining attapulgite clay with polymeric flocculants and coagulants, especially adsorbed on a dry formula.

Typically, polymeric flocculants and coagulants require predissolving them in water or at least further dilution before adding them to the water. The predissolution is required to fully hydrate or expand the polymer molecule before it is added to the system to which flocculation or coagulation is desired. Mixing is required to accomplish the desired predissolution and when mixing solid polymers, 30–60 minutes or more is recommended. Thus, use of these polymers in solid dry form would not be expected to be useful for effective water purification, especially purification which can be quickly accomplished.

It is also known that bentonite clay in dry form should not be added to the water all at once since doing so results in the formation of a gelatinous blob which can only be broken up by vigorous stirring. Thus, it would not be expected that a complete water purification composition could be formulated with bentonite having all of the bentonite contained in the composition so that it does not have to be added to the water in more than one dose.

In view of the above, a long felt need remains in the art for providing a single dry formulation composition which can remove pollutants and turbidity and disinfect the water to make it safer for drinking.

SUMMARY OF THE INVENTION

It is an object of this invention to provide a composition which contains the effectiveness of numerous water treating materials in a single dry mixture without the individual components interfering with each other.

It is a further object to provide a method of treating water to make it safer for drinking by means of a single dry composition which is added to the water being treated.

It is a further object to provide visually clean water in a short period of time which also inactivates germs and reduces the level of metal and organic contaminants.

It is a further object to provide a composition having rapid coagulation and settling times for quick treatment by means of the simultaneous or one step addition of the composition to the water.

It is a further object to provide a formulation for treating water which does not require complicated equipment or operator skill for effective water purification.

It is a further object to provide a water purification composition having a broad range of ingredients which are compatible with each other and which cooperate with each other in a synergistic manner for enhanced purification.

It is a further object to provide a water treating composition in the form of a tablet having all of the ingredients contained therein for quick and easy reduction of turbidity, metal and organic contaminants and harmful germs.

It is a further object to provide a water treating composition with ingredients which are approved for use in potable water.

It is a further object to provide a formula capable of functioning in a broad range of temperatures which could be encountered from tropical to polar climates.

It is a further object to provide a composition and method for treating water wherein turbidity, metal and organic contaminants and harmful germs or bacteria are removed by being quickly settled out of solution without the necessity of a separate filtration step.

These and other objects are met by providing a dry composition containing bentonite, zeolite and polymeric flocculant and/or coagulant. The bentonite may be either swelling bentonite (sometimes called western bentonite) or acid activated bentonite. If swelling or western bentonite is used, then the composition should additionally contain attapulgite clay. However, attapulgite clay may also be added to compositions containing acid activated bentonite or acid activated bentonite may be added to compositions containing swelling bentonite. When attapulgite clay is used in a composition containing polymeric flocculant (without any polymeric coagulant being present) then it is desirable to observe a ratio of bentonite to attapulgite wherein sufficient bentonite is contained in the composition so that a minimum ratio of bentonite to attapulgite is about 1.5:1. In those instances there is no upper limit to the amount of bentonite (i.e. higher ratios may be tolerated) which the composition may contain relative to the amount of attapulgite clay. Ratios of about 2-3 are preferred. Of course, extremely large amounts of bentonite would be undesirable since this could lead to the formation of a large amount of settled floc which would essentially take up an undesirable large amount of water and thereby leave little water available for drinking.

The above mentioned ingredients are blended together to form a dry composition which is used in the form of a powder or tablet. The coagulant, flocculant and bentonite clay (particularly the western or swelling bentonite) form flocs in the water which aid in the removal of turbidity. The attapulgite and zeolite function as adsorbents for removing contaminants such as metal and organic pollutants from the water. It has been discovered that all of these ingredients can be combined without each ingredient interfering with each other when the composition is formulated as a dry composition. It has also been discovered that the dry composition has enhanced dispersibility which is not observed in the individual ingredients.

It will be readily appreciated by those skilled in the art that various sources of water will have differing amounts of turbidity and pollutants contained therein. Thus, the relative amount of each ingredient used in the present composition can vary considerably, given the wide variation of pollutants and turbidity causing materials contained in many sources of water. Thus, the benefits of the present invention can be achieved by using the individual ingredients in effective amounts to remove the turbidity and pollutants or contaminants in the water being treated. Also, with respect to turbidity, it should be observed that some of the ingredients which may be included in the present invention, will actually contribute to the turbidity. Thus, the turbidity removing ingredients should be added in effective amounts to not only remove the naturally occuring turbidity in the water, but to also remove the turbidity causing ingredients (such as attapulgite clay) which may be included in the composition.

The adsorbants, such as zeolite and attapulgite clay, are used in the form of a fine powder to provide a large surface area for quick adsorption. As stated above, this actually contributes to the undesirable turbidity. However, it has been discovered that it is not necessary to use larger particles of adsorbent to avoid this turbidity if the coagulants and/or flocculants are selected so that they can remove the fine particles of adsorbent suspended in the water. Thus, fine particles of adsorbents can be used which remain in suspension for enhanced adsorption during the purification process but which are then removed along with contaminants or pollutants entrained therein as the coagulants and flocculants cause the suspended particles to form aggregates or flocs which quickly settle out of solution. Consequently, particle sizes of the adsorbents are used which form a suspension in the water and which can then be removed with the flocs.

It will generally be desired to include a biocide in the composition. However, the biocide, like all the ingredients used in the invention, must be in a dry form in the final composition. Certain biocides such as chlorine dioxide are to be avoided since they interfere with the polymeric materials contained in the composition and require very low pH for effectiveness.

Optional ingredients include silica gel, acidulant, buffer, sodium bicarbonate, binder, flavorant, colorant, CaO, Ca(OH)$_2$, alumina, kaolin (kaolinitic clays or kaolinite), fullers earth, alum, sericitic clays, semetic clays, sodium phosphate (NaH$_2$PO$_4$), KH$_2$PO$_4$, natural ion exchange clays, montmorillonite, bleaching clays or earth activated charcoal, and diatomaceous earth.

The composition may be formulated into a tablet by conventional techniques. Suitable binders which are well known for making pharmaceutical tablets or pills can be used for this purpose.

It is desirable to include a small amount of acidulent to the composition so that the pH of the treated water is brought into the optimum range required by the biocide. When the composition is in the form of a tablet or the like, an effective amount of sodium bicarbonate is desirably added to create a "fizz" or bubbling action which functions as an aid in tablet dissolution in water particularly when the composition contains an acidulent. However excessive bicarbonate should be avoided which could neutralize the acidity produced by the acidulant. This is especially important if alkaline water is being treated which would consume some acidity from the acidulant.

The composition of the present invention is used by dispersing the powder or tablet into the water and gently agitating it for a brief period of time whereupon the adsorbents are released into the water and are then eliminated along with the other turbidity causing materials as flocs begin to form. Care should be taken to avoid vigorous agitation or stirring so that the developing flocs do not break up. The flocs trap the turbidity causing materials along with the added adsorbents which, by the time the flocs form, have already trapped metals and organic pollutants therein. Additionally, when a biocide is present, it is released into the water to inactivate the germs before the flocs form in the water.

The purification action of this invention is obtained by the use of the several ingredients which cooperate with each other for enhanced water treatment and purification. The composition works by dispersing a variety of active materials into the water which rapidly adsorb the various impurities. Then, by a process of selfflocculation or coagulation, all of the impurities are gathered into a heavy floc which rapidly settles out, leaving clean, clear water. Only milligrams of the formula are required for treatment of the water.

Once the floc has settled out of the solution, the remaining water may be collected by decantation without any filtration step being absolutely essential. However, it may be desirable to use a coarse filter to remove the flocs from the water since this could result in the availability of more water for drinking which would not be the case if the water was simply decanted. When using a filter, it is not necessary to use a fine filter such as would be necessary if the turbidity causing materials were not trapped in the large flocs. Thus, a coarse filter such as cheese cloth, which is fine enough to trap the flocs but which is not fine enough to trap the suspended particles before flocculation, can be effectively used.

The composition of the present invention is a complete formulation, preferably in the form of a single tablet, which effectively removes particulates (turbidity), metals (lead, zinc, cadmium and others), organic contaminants such as solvents, and herbicides and pesticides, in a single convenient operation which does not require expensive equipment or skilled operators. Furthermore, the ingredients are compatible with each other and result in enhanced distribution in the water for quick and easy purification. Also, unlike other compositions, the present invention provides a composition containing a variety of adsorbents, flocculants and biocides which cooperate simultaneously with each other and thus, no follow-up or sequential steps are required for complete purification and clarification.

The present invention also uses attapulgite clay in combination with other ingredients in a manner which has never before been possible. Unlike prior art compositions, the complete formulation is usable as a dry formulation without any pre-mixing being required and thus has the added benefit of having a long shelf-life.

The present invention also produces unexpected large flocs when bentonite and attapulgite clay are combined with polymeric flocculant and/or coagulant. For example, it is not possible to form an acceptable large floc when using attapulgite clay with polymeric coagulant and/or flocculant when bentonite is not also present. Large floc is needed to promote rapid settling, filtration etc. If a filter is too fine, unacceptably long filtrations will be required. Likewise, suitable flocs will not form when zeolite is combined with polymeric flocculant in the absence of bentonite. It is surprising that the bentonite and attapulgite clay can not cooperate in this manner since they both develop negative charges. As a result of these negative charges on the both the bentonite and attapulgite, it is surprising that bentonite can cooperate with the attapulgite to form suitable flocs which additionally removes the attapulgite.

DETAILED DESCRIPTION OF THE INVENTION AND PREFERRED EMBODIMENTS

The composition of the present invention is formed by blending the dry ingredients in the form of a powder. Very fine powders of the adsorbants are preferred to further increases the dispersion in water and to provide high surface area and rapid sorption of impurities so that the formulas work well within a few minutes. Preferably the polymeric ingredients (polymeric flocculant and coagulant) can be sorbed on the attapulgite clay, then dried and ground to a fine powder prior to the actual blending. It has been discovered that when polymers are sorbed on the attapulgite clay in this manner, sufficient polymer will desorb and be available for flocculation of the remainder of the formulation.

It has been observed that zeolite powder will not blend easily with bentonite and attapulgite clay even though the latter two materials will blend with each other. If these three materials are to be properly mixed with each other to form a uniform, homogeneous powder, some method must be employed which will break up the loose clumps of zeolite and cause it to be dispersed in the clays; otherwise pockets of zeolite remain and are visually apparent in the formula. Any mechanical method may be used. However, this is preferably accomplished in a tumbling operation which uses ceramic pellets to aid in the break up and mixing.

It is important that the biocide not be incorporated during the tumbling or grinding step since this would result in further reduction of the particle size of the biocide in the final formula. Reduction in the particle size of the biocide results in an increase in surface area that becomes available for reaction with the water of hydration in the clays. This may result in liberation of halogen which will react with the polymeric ingredients and thereby inactivate them. Thus the shelf life will be shortened. Likewise, acidulents should also not be added until after the grinding step since a decrease in the particle size of the acidulent would allow it to hydroscopically draw more moisture from the air during processing, with a subsequent reduction in storage or shelf life of the product.

Swelling bentonite is preferred over acid-activated bentonite for the clarification of water and for removing other ingredients from the composition after they have performed their respective functions in the water. However, when it is desired to remove organic contaminants it is preferable to use acid-activated bentonite. The attapulgite clay augments the formulas which use the swelling bentonite for organic removal. It has been discovered that swelling bentonite helps remove acid activated bentonite from the water and thus is useful when combined with compositions containing acid activated bentonite. Also, with respect to the acid activated bentonite, it has been observed that it has very low ion exchange capacity in comparison to zeolite. In particular, it has been observed that zeolite has almost 100 times more ion exchange capacity than acid activated clay.

Both acid activated and swelling bentonite (also called sodium bentonite, Wyoming bentonite or Western bentonite) are well known materials which are commercially available. Acid activation of bentonite is a well known procedure wherein the bentonite is treated with mineral acid to yield a modified clay of high surface area and acidity that exhibits enhanced adsorptive and catalytic properties. Both swelling bentonite and acid activated bentonite are described in an article entitled "Acid Activated Clays" published by the Society of Mining Engineers of AIME; Transactions, volume 282, pages 1901-1909; which is herein by reference.

Different types of bentonite may be combined if desired to achieve the select adsorption of a variety of pollutants. The bentonite, as well as other ingredients used in the composition, should be free from harmful or toxic ingredients which could enter the water being purified.

Both natural and synthetic zeolites are useful in this invention. Useful zeolites include mordenite powder (sodium form and hydrogen form). The ammonium of mordenite powder is not preferred.

The sodium form of mordenite powder is available from PQ Corporation which is sold under the trademark "VALFOR" C 500-11 zeolite. The C 500-11 zeolite has the following properties:

A number of suitable zeolites are sold under the trademark "ZEOLON" which are sold by the Norton Company. Suitable zeolites in the "ZEOLON" series include "ZEOLON 400", "ZEOLON 500", "ZEOLON 700", "ZEOLON 900 Na" and "ZEOLON 900 H". The physical characteristics and chemical analysis of the above mentioned "ZEOLON" zeolites are shown below in Tables 1 and 2:

TABLE 1

Physical Characteristics of "ZEOLON" Zeolites

| Zeolon | Mineralogical Classification | Occurrence | Ring Members | Molar $SiO_3/Al_2O_3$ | Effective Pore Diameter (A) | Crystalline Void Volume (cc/cc) | Crystalinity (%) | Packing (kg/m$^2$) | Density (lb/ft$^3$) | Available Forms P | A | E |
|---|---|---|---|---|---|---|---|---|---|---|---|---|
| 400 | Clinoptilolite | Natural | 10 | 10:1 | 3.5 | .34 | 90-95 | 690-750 | 43-47 | — | — | — |
| 500 | Chabazite Erionite | Natural | 8 | 5:1 | 4.3 | .47 | 70-95 | 690-720 | 43-45 | — | — | — |
| 700 | Ferrierite | Natural | 10 | 10:1 | 3.9 | .28 | 70-05 | 690-750 | 43-47 | — | — | |
| 900 Na | Mordenite | Synthetic | 12 | 10:1 | 7 | .28 | 80-95 | 720-750 | 45-47 | — | — | |
| 900 H | Mordenite | Synthetic | 12 | 10-13:1 | 8-9 | .28 | 80-95 | 720-750 | 45-47 | — | — | |

Powder (P) typically sized within 5-12 microns.
Aggregate (A) typically sized within 30-84 mm (297-840 microns, or 20/50 U.S. Standard Mesh).
Extrudates (E) are available in nominal diameters of 1.5 mm (1/16") and 3.2 mm (1/8").
Values reported for Zeolon 400, 500, and 700 relate to "as-mined" materials.
Crystalinity of Zeolon 900 will vary inversely with particle sizing.

TABLE 2

Chemical Analysis of "ZEOLON" Zeolites

| Zeolon | $SiO_2$ | $Al_2O_3$ | $Fe_2O_2$ | $TiO_2$ | CaO | MgO | $Na_2O$ | $K_2O$ | Dominant Cations |
|---|---|---|---|---|---|---|---|---|---|
| 400 | 55-78 | 13-17 | 1.0-5.0 | .2-.7 | .5-3.5 | .2-1.5 | 1.5-3.0 | 2.0-8.0 | K, Na |
| 500 | 62-72 | 15-19 | 2.0-4.5 | .2-.6 | 2.0-5.0 | 1.0-3.0 | 2.0-6.0 | .5-2.5 | Ca, Na |
| 700 | 69-77 | 12-17 | .5-2.5 | .2-.6 | .2-1.0 | .1-1.5 | 2.0-3.0 | 5.0-7.5 | K, Mg, Na |
| 900 | 74-81 | 10-13 | .5-1.0 | <.5 | <.6 | <.6 | 5.0-8.5* | <.6 | Na |

*$Na_2O$ is typically <.5% for Hydrogen-exchanged Zeolon 900.

| C-500-11 Zeolite | |
|---|---|
| Form | Powder |
| $SiO_2/Al_2O_3$ Molar Ratio | 10.5-12 |
| Surface Area | 425-450 m$_2$/g |
| Cyclohexane Adsorption Capacity | 7-8 g/100 g |
| Crystal Size | 1-2 um |
| Particle Size | 4-5 um |

The hydrogen form of mordenite powder is available from PQ corporation which is sold under the trademark "VALFOR" C 505-20 zeolite. The C 505-20 zeolite has the following properties:

| C 505-20 Zeolite | |
|---|---|
| Form | Powder |
| $SiO_2/Al_2O_3$ Molar Ratio | 20-22 |
| $Na_2O$ | 75-300 ppm. anhydrous |
| Surface Area | 450-550 m$_2$/g |
| Cyclohexane Adsorption Capacity | 7-9 g/100 g |
| Crystal Size | 1-2 um |
| Particle Size | 4-5 um |

Another suitable zeolite is synthetic type A zeolite in the sodium form. Such a zeolite is available from PQ corporation sold under the trademark "VALFOR" G 100. The "VALFOR" G 100 has the following properties:

| Properties of "VALFOR" G 100 Zeolite | |
|---|---|
| Form | Free Flowing Powder |
| Color, by Hunter Color Test | White, L = 98-99 a = −0.1 b = +1.0 |
| Brightness, (%), by TAPPI Method | 96-97 |
| Refractive Index | 1.48 |
| Crystal Structure | Cubic |
| Crystal Shape | Cubic |
| Bulk Density (lbs/ft$^3$) | 26-29 |
| Crystal Density (g/cm$^3$) | 1.99 |
| Mean Particle Size (microns) | 4-5 |
| Moh's Hardness | 4-5 |
| Moisture Loss at 800° C. (wt. %) | 18-22 |
| pH of 1% Dispersion | 10.6-11.1 |
| Nominal Pore Size Diameter (Å) | 4.2 |
| Internal Surface Area (m$^2$/g) | 800 |
| Moisture Adsorption after Activation by Heating to 500° C. (lbs. H$_2$O/100 lbs. activated zeolite) | 28 |
| Zeta Potential (millivolt), in deionized water | −33.3 |
| Sinter Temperature (°C.) | 700 |
| Thermal Coefficient of Expansion (°C.$^{-1}$) | 6.9 × 10$^{-6}$ |
| Electrical Conductivity (ohm$^{-1}$cm$^{-1}$) | 5 × 10$^{-4}$ |
| Oil Absorption (lbs/100 lbs. VALFOR G100) | 29 |
| Abrasiveness, by Valley Test (mg) | 7 |
| pH Stability Range | 6-12 |
| pH Titration Curve zeolite (10% Slurry) | ph (after 1 hr.) 11.0 | meq. H$^+$ added */g. 0 |

-continued

| Properties of "VALFOR" G 100 Zeolite | |
|---|---|
| 6.0 | 1.1 |
| 5.5 | 1.6 |
| 5.0 | 3.4 |
| 4.5 | 4.5 |
| 4.0 | 7.9 |

*with slow addition of acid

It has also been discovered that zeolites can be useful for removing radionucleides from water. The above mentioned "VALFOR" G100 in the alkaline earth series or the "VALFOR" C500-11 or "VALFOR" C505-20 are preferred for this purpose.

The attapulgite clay should have low solubility in water and should resist degradation since excessive cloudiness can occur in the water if the attapulgite breaks down. Pharmaceutical or cosmetic grades of attapulgite are suitable. A suitable attapulgite clay is available from Englehard Minerals which is sold under the trademark "PHARMASORB". "PHARMASORB" is sold in both colloidal and regular form. The regular form is preferred. The regular "PHARMASORB" has the properties shown below in Table 3.

TABLE 3

| "PHARMASORB" | |
|---|---|
| | Regular[1] |
| Physical form | Micronized Powders |
| Average Particle Size (Equivalent Spherical Diameter in Microns) | 3 |
| Solubility and | Essentially insoluble in water dilute alkali Partially soluble in acids which leach out a small portion of constituents. |
| Free Moisture Content (As produced) Wt. % determined at 220° F. | 1 |
| Volatile Matter, as produced (% Wt. Loss @ 1200° F., Moisture-Free Basis) | 5 |
| Ignition Loss at 1800° F. (Wt. %, as produced) | 6.0 |
| Bulking Value: | |
| Pounds per Gallon | 20.58 |
| Gallons per Pound | 0.0486 |
| pH | 7.5-9.5 |
| Color | Cream |
| Specific Gravity | 2.47 |
| Residue on 325 Mesh Screen, Max. (Wt. %, Wet) | 0.05 |
| Tamped Bulk Density (lbs./cu. ft.) | 15-18 |
| Heavy Metals - Max., ppm (lead equivalent)[2] | 20 |
| Lead - max., ppm | 10 |
| Arsenic - max., ppm | 2 |
| B.E.T. Surface Area, $m^2/gm$ (Moisture - Free Basis) | 125 |

| Analysis of "PHARMASORB" (Volatile-Free Basis) | |
|---|---|
| $SiO_2$ | 67.0% |
| $Al_2O_3$ | 12.5% |
| MgO | 11.0% |
| $Fe_2O_3$ | 4.0% |
| CaO | 2.5% |
| Other | 3.0% |
| Total | 100.0% |

[1]Generally used for heavy loading in adsorptive or carrier applications.
[2]British Pharmacopoeia Method, 1983 Edition.
The major constituents shown in the analysis are combined as complex magnesium aluminum silicate and do not exist as free oxides.

Another suitable attapulgite clay is Floridin attapulgite (Florida-Georgia fuller's earth). As noted above, the attapulgite should resist water breakdown. LVM (low volatile matter) grades of attapulgite are known to resist disintegration in water. A suitable LVM attapulgite is available from Floridin Corporation under the trademark "FLOREX" LVM attapulgite. The chemical analysis and physical properties of "FLOREX" LVM attapulgite is shown below in Tables 4 and 5:

TABLE 4

| Chemical Analysis of "FLOREX" LVM Attapulgite | |
|---|---|
| Si as $SiO_2$ | 66.21% |
| Al as $Al_2O_3$ | 11.71% |
| Fe as $Fe_2O_3$ | 4.02% |
| P as $P_2O_5$ | 0.99% |
| Ca as CaO | 2.92% |
| Mg as MgO | 9.70% |
| K as $K_2$ | 1.07% |
| Other | 3.38% |

Note: Although major constituents shown in the typical analysis are reported as oxides, they are actually combined as complex silicates in FLOREX.

TABLE 5

| Physical Properties of "FLOREX" LVM Attapulgite | |
|---|---|
| | LVM |
| Color | Tan |
| Free Moisture (as produced), % | 2 |
| Combinded moisture, % | 6 |
| pH | 8 |
| Surface area, $m^2/g$ | 125 |
| Specific gravity | 2.5 |
| Angle of repose, degrees (100/up and 200/up 30°) | 31 |
| Base exchange capacity (milliequivalents/100 g) | 20 |
| Pore volume, ml/g | 0.524 |
| Void space & porosity, % | |
| Grades up to 24/48 | 45 |
| Grades 30/60 and finer | 39 |
| Bulk density, free fall, lbs./ft.$^3$ | 34 |
| Water Breakdown | Resists water breakdown |

Conventional polymeric flocculants and polymeric coagulants which are known for use in treating water may be used in this invention. The coagulants are generally low molecular weight, high charge polymers whereas the flocculants are high molecular weight, low charge polymers. The coagulants are better at charge neutralization of the clays than the flocculants but the flocculants are better for building larger and heavier flocs which settle rapidly. The coagulant and flocculent are added in amount to neutralize the charge of the bentonite and attapulgite clay. Amounts of coagulant and flocculent in excess of the amount needed for charge neutralization are not necessary and should be avoided since an excess will cause a dispersal effect.

Neutralization need not be absolutely precise since it is only necessary that the charge on the clay be sufficiently neutralized to form flocs containing the clay and polymeric coagulant or polymeric flocculent. The amount of polymer needed will depend upon the amount of clay in the composition and the charge neutralization capacity of the polymer being utilized. For example, the charge neutralization capacity of "CLARIFLOC" C 358 P is 6.31 milliequivalents per gram whereas the charge neutralization capacity for "CLARIFLOC" C 319 P is higher at 7.37 milliequivalents per gram. Thus the amount of C 358 P necessary to produce the equivalent charge neutralization achieved with C 319 P can be readily calculated.

Cationic polymers are used to neutralize the charge when the composition contains swelling bentonite whereas anionic polymers are used with compositions containing acid activated bentonite. Neutral polymer coagulants and flocculants may be used where no further neutralization is needed.

Coagulants are preferred over flocculants especially because the chemical structure of the coagulants are more stable against degradation caused by halogen biocides which may be included in the composition. Also coagulants are preferred because of their higher charge neutralization capacity over flocculants. In both coagulants and flocculants, higher molecular weight polymers are preferred over lower molecular weight polymers.

Suitable polymeric flocculants include polyacrylamide polymers or copolymers thereof having acrylic acid or acrylate co-monomers. Suitable polymeric coagulants include quaternary condensation polymers of epichlorohydrin and dimethyl amine; quaternary ammonium compounds of vinyl polymers; amine polycondensates and polydiallyl dimethyl ammonium chloride. Other useful polymer coagulants and flocculants are described in U.S. Pat. No. 4,415,467, the specification of which is incorporated herein by reference.

Preferably the coagulants and flocculants should be chosen so as not to impart any objectionable taste to the water. Ideally, the coagulant and flocculant should be one which functions in a wide temperature range which approaches the freezing point of water. Also, when using acid activated bentonite it is prefered to use an anionic polymer and when using swelling bentonite, it is preferred to use a cationic polymer.

A preferred coagulant is polydiallyldimethyl ammonium chloride which has the formula $[CH_2CHCH_2)N(CH_3)_2Cl]_x$. The value for X is not critical. However, it is preferred that X be chosen so that the polymer has a molecular weight of about several thousand. A suitable polydiallyldimethyl ammonium chloride polymer has a CAS number which is CAS 26062-79-3 (polymer). One such polymer is commercially available in the form of an aqueous solution from Polypure Inc. under the trademark "CLARIFLOC" C-308 P polymer. The C-308 P is a light amber color liquid which is completely soluble in water. It has a boiling point of 100° C., a melting of 0° C., a specific gravity of 1.03-1.05 and a pH of 5-7.

Another polydiallyldimethyl ammonium chloride coagulant is available from Polypure Inc. under the trademark "CLARIFLOC" polymer C-358 P. The C-358 P polymer is sold as an aqueous solution. It has the same formula as the "CLARIFLOC" C-308 P but has a higher molecular weight. The C-358 P polymer has a CAS number which is CAS 26062-79-3 (polymer). The C-358 P is a light amber clear viscous liquid having a cationic ionic nature. It has a density of 8.7 lbs/gal; a pH of 5-7, a flashpoint greater than 100° C., a freezing point of $-15°$ C., a boiling point of approximately 100° C., a melting point of approximately 0° C., a specific gravity of 1.03-1.05 and is completely soluble in water.

Another preferred coagulant is a quaternary condensation polymer of epichlorohydrin and dimethylamine which has the formula $[(CH_2CHOHCH_2)N(CH_3)_2Cl]_x$. The value for X is not critical but it is preferred that X be chosen so that the polymer has a molecular weight of about several thousand. A suitable polymer having the above formula has a CAS number which is CAS 42751-79-1(polymer). Such a polymer is commercially available from Polypure Inc. under the trademark "CLARIFLOC" C-319 P polymer. The C-319 P polymer is sold as an aqueous solution. The C-319 P polymer is a clear amber-red liquid which is highly cationic. It has a density of 9.42 lbs/gal, a pH of 6, a viscosity of 4,500-7,500 cps, a freezing point of $-9°$ C., a boiling point of 100° C., a melting point of 0° C., a specific gravity of 1.13 and is completely soluble in water.

Another suitable polymeric coagulant is a highly charged cationic liquid polymer (quaternary ammonium compound vinyl polymer) available from Ashland Chemical Company (Drew Industrial Division) a division of Ashland Oil Inc. under the trademark "AMERFLOC" 482. The "AMERFLOC" 482 is a clear to pale yellow liquid which has a specific gravity of 1.04 (at 25° C.), a viscosity of 120 cps (at 25° C.), a pH of 6 and a freezing point of $-6°$ C.

In the polypure "CLARIFLOC" polymer series, the C-358 P is the most preferred coagulant. No maximum molecular weight is specifically required for the coagulants or flocculants used in this invention.

Any activated carbon can be used which is in the form of a fine powder. A suitable activated carbon is available from ICI Americas Inc. which is sold under the trademark "HYDRODARCO" B. The "HYDRODARCO" B has the following properties which are shown below in Table 6:

TABLE 6

| | Properties of "HYDRODARCO" B Powdered Activated Carbon | |
|---|---|---|
| | Typical Values | AWWA B-600-78* Specifications |
| Iodine No. | 580 | 500 (min) |
| Modified Phenol Value | 28 MPV (3.2 g/l) | 30 max. MPV (3.5 g/l) |
| Tannin Value** | 350 | Tannin not more than 10% greater than reference sample |
| Odor Adsorption Capacity | Reference sample furnished | Taste and odor reduction not less than 70% of reference sample |
| Moisture (as packed) | 4% | 8% max. |
| Apparent Density | 0.5 gms/ml | 0.2-0.75 gms./ml |
| Particle size distribution | | |
| through 100 mesh (%) | 99 | 99 min. |
| through 200 mesh (%) | 95 | 95 min. |
| through 325 mesh (%) | 90 | 90 min. |

*HYDRODARCO B conforms to AWWA B-600-78 standards for potable water treatment
**ppm carbon required to reduce 20 ppm tannin to 2 ppm.

A suitable silica gel is available from Amicon Corp. (a division of WR Grace and Co.) which is sold under the trademark "MATREX" Silica. The "MATREX" Silica is available in nominal pore sizes of 60 Å and 100 Å with 60 Å being preferred. The physical characteristics of the 60 Å and 100 Å "MATREX" silicas are shown below in Table 7:

TABLE 7

Physical Properties of "MATREX" Silica
BASE GEL DATA

| | Nominal Pore Sizes | |
|---|---|---|
| | 60 Å | 100 Å |
| Specific Surface Area (m²/g) | 480 m²/g | 300 m²/g |
| Specific Pore Volume (ml/g) | 0.8 ml/g | 1.1 ml/g |
| pH (5% suspension) | 6.5–7.5 | 7.0–8.0 |
| H$_2$O (weight %) | ≦5 | ≦5 |
| Chemical Analysis | | |
| SiO$_2$ | 99.6% | 99.6% |
| Na+ | ≦600 ppm | ≦600 ppm |
| Ca+ | ≦100 ppm | ≦100 ppm |
| Fe+ | ≦80 ppm | ≦80 ppm |
| SO$_4$⁻ | ≦300 ppm | ≦300 ppm |
| Cl⁻ | ≦60 ppm | ≦60 ppm |
| Particle Size Distribution | | |
| Median Diameter (μm) | Range | |
| 10 (9.5) | 8.5–10.5 | |
| 15 (14.5) | 13.0–16.0 | |
| 20 | 16.0–24.0 | |
| 30 | 20.0–45.0 | |
| 50 | 35.0–70.0 | |
| 105 | 90.0–130.0 | |

Suitable biocides include tetraglycine hydroperiodide and sodium dichloroisocyanurate. Suitable buffer includes disodium pyrophosphate. Preferably the buffer is added in an amount to buffer the pH of the water at about a pH of 6.

The composition is made by blending the ingredients in the form of a powder to form a homogeneous mixture. Therefore, starting materials such as the coagulants which are in the form of a liquid, are preferably adsorbed on a solid ingredient and allowed to dry before blending into a final product. For example, the polymeric coagulants or flocculants which may initially be in the form of an aqueous solution, may first be sorbed on the attapulgite clay. The clay containing the coagulant or flocculant is then dried using an air dryer, vacuum oven or other suitable drying device. The dried clay containing the sorbed coagulant or flocculant is then ground to a powder using a ball mill or similar technique.

The grinding may be accomplished in a conventional tumbler device with the use of ceramic balls or pellets. The use of ceramic pellets during the tumbling operation helps blend and break up any loose clumps of zeolite to aid in the formation of a homogenous blend with the bentonite and attapulgite clay and other ingredients. However, if a biocide is to be added, it should be added after the tumbling or grinding step with the ceramic pellets removed. Likewise, acidulant should not be added until after the tumbling or grinding step with the ceramic pellets removed.

Tablets or the like may be formed by conventional tableting procedures. Preferably a binder such as microcrystalline cellulose or carboxy methyl cellulose is added to form the tablets. Other conventional binders for forming pharmaceutical tablets can be used.

It has been observed that coagulants hydrate more rapidly than solid flocculants. Using this difference in hydration rate, it is possible to add both types of polymers (coagulant and flocculant) to obtain an advantage in building the floc. More particularly, the cationic coagulant can rapidly hydrate and neutralize the charge on the clays. When complete, a non-ionic flocculant can take over and pull all of the smaller floc together to obtain a large floc than might ordinarily be It has also been observed that pretreating the bentonite, attapulgite and/or zeolite with a strong solution of biocide helps kill microorganisms that become lodged in the lamella of bentonite or the pore structure of the attapulgite or within the zeolite during its actual use in water treatment. The biocide is pre-adsorbed on the bentonite so that the pores become filled with the biocide before the bacteria or other germs have a chance to become lodged in the pores and thereby become protected from the biocide released in the water. The bentonite does not necessarily have bacteria or other germs in it before being added to the water. The pretreatment step is desirable since the bacteria or other germs may not all be killed during the clarification procedure due to the fact that they become hidden within the structure of the above mentioned solid materials. One would not ordinarily think that this type of sorbtion could occur since it is not the typical material bentonites adsorb in their structure.

The pretreatment involves preparation of a strong solution of biocide and soaking the bentonite, attapulgite and/or zeolite for a few minutes in the solution. The excess liquid is filtered off and the treated material is dried. After drying, the pretreated material may then be blended into the product. Additional biocide may or may not be required in the final formula.

In a first embodiment, Western bentonite is mixed with attapulgite clay, zeolite, activated charcoal, tetraglycine hydroperiodide (TGHPI) and polymeric flocculant. The amount of each ingredient combined with bentonite is given below in Table 8 with the amount of each ingredient being expressed in term of weight % relative to the amount of bentonite.

TABLE 8

| Ingredient | Amount |
|---|---|
| Attapulgite Clay | up to 67 wt. % |
| Zeolite | up to 100 wt. % |
| Activated Charcoal | up to 100 wt. % |
| Tetraglycine hydroperiodide (TGHPI) | up to 1.5 wt. % |
| Polymer flocculent | up to 2.5 wt. % |

EXAMPLE 1

An example of the first embodiment contains 201 mg. Western bentonite, 77.5 mg attapulgite clay, 201 mg zeolite (synthetic Type A—sodium form), 2.1 mg TGHPI, 1.0 mg polyacrylamide polymer flocculant. The formulation of Example 1 is in the form of a powder. The powder of Example 1 may be formed into a tablet by using about 50 mg of microcrystalline cellulose binder to make a formulation which is 610.1 mg/tablet.

In a second embodiment, acid activated bentonite is combined with attapulgite clay, zeolite, sodium phosphate, sodium bicarbonate, sodium dichloroisocyanurate, polymeric flocculant (polyacrylamide/acrylate copolymer) and binder. The amount of each ingredient mixed with the bentonite is given below in Table 9 with the amount of each ingredient being expressed in terms of weight % relative to the amount of bentonite.

TABLE 9

| Ingredient | Amount |
|---|---|
| Attapulgite Clay | up to 67 wt. % |

TABLE 9-continued

| Ingredient | Amount |
| --- | --- |
| Zeolite | up to 67 wt. % |
| NaH$_2$PO$_4$ | up to 2.4 wt. % |
| NaHCO$_3$ | up to 60 wt. % |
| sodium dichloroisocyanurate | up to 8 wt. % |
| Polymer flocculent | up to 2 wt. % |
| Binder | up to 25 wt. % |

EXAMPLE 2

An example of the second embodiment is a tablet containing 252 mg acid activated clay, 150 mg attapulgite clay, 170 mg zeolite (synthetic type A-sodium form), 5.0 mg sodium phosphate, 10 mg sodium bicarbonate, 15 mg sodium dichloroisocyanurate, 1 mg polyacrylamide/acrylate flocculant, 50 mg microcrystalline cellulose. Each tablet weighs 653 mg.

In a third embodiment acid activated bentonite is combined with silica gel, sodium dichloroisocyanurate, sodium bicarbonate polymer flocculant and binder. The amount of each ingredient mixed with the bentonite is given below in Table 10 with the amount of each ingredient being expressed in terms of weight % relative to the amount of bentonite.

TABLE 10

| Ingredient | Amount |
| --- | --- |
| Silica gel | up to 62 wt. % |
| *sodium dichloroisocyanurate | up to 6.8 wt. % |
| NaHCO$_3$ | up to 41 wt. % |
| Polymer flocculent | up to 1.0 wt. % |
| Binder | up to 55 wt. % |

*may be substituted with up to 6.8 wt. % TGHPI

EXAMPLE 3

An example of the third embodiment is a tablet containing 365 mg acid activated bentonite, 180 mg silica gel, 15 mg sodium dichloroisocyanurate, 50 mg sodium bicarbonate, 1 mg polyacrylamide/acrylate flocculant and 50 mg. sodium carboxymethylcellulose. Example 3 is in the form of a tablet weighing 661 mg/tablet.

In a fourth embodiment, acid activated bentonite is combined with zeolite, silica gel, disodium pyrophosphate, sodium dichloroisocyanurate, polymer flocculent and sodium bicarbonate. The amount of each ingredient combined with the bentonite is given below in Table 11 with the amount of each ingredient being expressed in terms of weight percent relative to the amount of bentonite.

TABLE 11

| Ingredient | Amount |
| --- | --- |
| Zeolite | up to 67 wt. % |
| Silica Gel | up to 63 wt. % |
| disodium pyrophosphate | up to 30 wt. % |
| sodium dichloroisocyanurate | up to 5 wt. % |
| Polymer flocculent | up to 1.0 wt. % |
| NaHCO$_3$ | up to 38 wt. % |
| Binder (optional) | |

EXAMPLE 4

An example of the fourth embodiment contains 399 mg acid activated bentonite, 160 mg zeolite (synthetic Type A—sodium form), 100 mg silica gel, 100 mg disodium pyrophosphate, 15 mg sodium dichloroisocyanurate, 1 mg polyacrylamide/acrylate copolymer flocculant, and 50 mg sodium bicarbonate. The powder of Example 4 is formed into a tablet by using 50 mg of sodium carboxymethylcellulose binder to make a tablet which is 875 mg/tablet.

In a fifth embodiment swelling bentonite is combined with attapulgite clay, zeolite, sodium dichloroisocyanurate, polyacrylamide flocculant, sodium bicarbonate, and disodiumpyrophosphate. The amount of each ingredient mixed with the bentonite is given below in Table 12 with the amount of each ingredient being expressed in terms of weight % relative to the amount of bentonite.

TABLE 12

| Ingredient | Amount |
| --- | --- |
| Attapulgite Clay | up to 66 wt. % |
| Zeolite | up to 63 wt. % |
| Biocide | up to 5.7 wt. % |
| Polymer flocculent | up to 5.7 wt. % |
| NAHCO$_3$ | up to 43 wt. % |
| disodium pyrophosphate | up to 34.3 wt. % |

EXAMPLE 5

An example of the fifth embodiment of the invention contains 350 mg swelling bentonite, 150 mg attapulgite clay, 150 mg zeolite, 15 mg biocide (TGHPI), 20 mg polyacrylamide flocculant, 100 mg sodium bicarbonate and 100 mg disodium pyrophosphate. The formulation of Example 5 is in the form of a powder. The powder of Example 5 is formed into a tablet by using 50 mg of microcrystalline cellulose binder to form tablets which are 925 mg/tablet.

A preferred embodiment of the invention contains 325 mg swelling bentonite, 150 mg attapulgite clay, ("PHARMASORB" regular), 130 mg zeolite (synthetic type A-sodium form "VALFOR" G100), 12 mg polydiallyldimethyl ammonium chloride ("CLARIFLOC" polymer C-358 P), 15 mg sodium dichloroisocyanurate, 100 mg. sodium bicarbonate, 100 mg sodium pyrophosphate and 50 mg microcrystalline cellulose. The microcrystalline cellulose binder may be omitted if the formulation is not to be formed into a tablet. This preferred embodiment may also include 1.0 mg polyacrylamide or polyacrylamide/acrylate copolymer as a flocculant. The "CLARIFLOC" C-358 P is added in the form of an aqueous solution containing 80 wt. % water and 20 wt. % polymer. 60 Mg of the solution is sorbed on the attapulgite clay and the water is evaporated to result in 12 mg of polymer (dry weight) in the product.

When making the above preferred composition in bulk quantities, the ingredients are used in the following amounts expressed in terms of wt. % relative to the amount of bentonite contained in the composition:

| Ingredient | Amount | Preferred Amount |
| --- | --- | --- |
| attapulgite clay | up to 200 wt. % | 46.2 wt. % |
| Zeolite | up to 200 wt. % | 40 wt. % |
| Biocide | up to 5 wt. % | 4.6 wt. % |
| polymer coagulant (dry wt.) | up to 5 wt. % | 3.7 wt. % |
| polymer flocculant (optional) | up to .3 wt. % | .3 wt. % |
| NaHCO$_3$ | up to 65 wt. % | 30.8 wt. % |
| Na$_2$H$_2$P$_2$O$_7$ | up to 65 wt. % | 30.8 wt. % |

The preferred formulation described above can be used to purify one liter of water by adding one or two tablets to the water (or an equivalent amount of the powder) and agitating the water by swirling or gently shaking it for three minutes. The water is then allowed to settle, which takes about 10 minutes at 25° C. (about 18 minutes at 15° C.–5° C.). After settling, the clarified water may be decanted or passed through a paper or cloth filter. The decanted or filtered water is ready for drinking.

EXAMPLE 6

A composition was prepared containing 145 mg swelling bentonite, 72 mg attapulgite clay, 108 mg zeolite (synthetic type A—sodium form) 44 mg activated charcoal ("HYDRODARCO" B), 28 mg TGHPI, 3 mg polyacrylamide flocculant. The material of Example 6 was used to purify water. The results are summarized below in Table 13.

TABLE 13

|  | Control (No Treatment) | After Treatment |
|---|---|---|
| Coliform bacteria | 500 # colonies/100 ml | 1 colonies/100 ml |
| NTU turbidity | 35 | 9.0 |
| suspended solids | 60 mg/l | L 1 mg/l |
| Lead | <0.1 mg/l | <0.5 mg/l |
| Iron | 0.65 mg/l | <0.05 mg/l |
| FID scan | 1200 μg/l | 290 mg/l |
| acetone | 160 μg/l | <5.0 μg/l |
| chlorobenzene | 32 μg/l | 5.0 μg/l |
| ethyl ether | 16 μg/l | 1.8 μg/l |
| isopropyl ether | 100 μg/l | <5.0 μg/l |
| MIBK | 250 μg/l | 29.0 μg/l |
| toluene | 10 μg/l | 4.0 μg/l |
| xylene | 30 μg/l | 11.0 μg/l |

The composition used in Example 6 may be made in bulk quantities by using the following ingredients in the amounts specified in terms of wt. % relative to the amount of bentonite contained in the composition:

| Ingredient | Amount | Preferred Amount |
|---|---|---|
| attapulgite clay | up to 60 wt. % | 50 wt. % |
| Zeolite | up to 100 wt. % | 75 wt. % |
| activated charcoal | up to 50 wt. % | 30 wt. % |
| TGHPI | up to 20 wt. % | 19 wt. % |
| Polyacrylamide | up to 4 wt. % | 2 wt. % |

EXAMPLE 7

A composition was prepared containing 287 mg Western bentonite, 110 mg attapulgite clay, 287 mg zeolite (synthetic type A—sodium form), 110 mg activated charcoal ("HYDRODARCO" B), 3 mg TGHPI, and 0.14 mg polyacrylamide/acrylate copolymer flocculant. Contaminated water was treated with the composition of Example 7 with the results summarized below in Table 14.

TABLE 14

|  | Control (No Treatment) | After Treatment |
|---|---|---|
| standard plate count | 1800 colonies/ml | 3 colonies/ml |
| NTU turbidity | 23 | 4 |
| suspended solids | 27 mg/l | 3 mg/l |
| lead | 0.8 mg/l | <0.1 mg/l |
| cadmium | 0.98 mg/l | 0.05 mg/l |
| FID scan | 89 μg/l | 19 μg/l |
| Color | 71 std units | 13 std units |

429 mg of the composition shown by Example 2 was used to treat water. The results of the treatment are shown below in Table 15.

TABLE 15

|  | Control (No Treatment) | After Treatment |
|---|---|---|
| NTU Turbidity | 800 | 12 |
| bacteria | 10$^6$/ml | 0/ml |

600 mg of the composition shown in Example 3 was used to treat contaminated water. The results of the treatment are summarized below in Table 16.

TABLE 16

|  | Control (No Treatment) | After Treatment |
|---|---|---|
| NTU Turbidity | 550 | 19 |
| bacteria | 10$^6$/ml | 0/ml |

600 mg of the formula shown in Example 4 were used to treat contaminated water. The results of the treatment are summarized below in Table 17.

TABLE 17

|  | Control (No Treatment) | After Treatment |
|---|---|---|
| Cu | 2.0 mg/l | 0.06 mg./l |
| Ni | 1.0 mg/l | 0.23 mg./l |
| bacteria | 10$^6$/ml | 0/ml |

831 mg of the preferred embodiment was used to treat 1 liter of contaminated water. The results are summarized in Table 18 below:

TABLE 18

|  | Before | After |
|---|---|---|
| Bacteria | 10$^6$/ml | 0/ml |

I claim:

1. A composition for purifying water which comprises bentonite clay selected from the group consisting of swelling bentonite and acid activated bentonite; zeolite; biocide and an anionic or cationic polymeric ingredient selected from the group consisting of polymeric flocculents and coagulants; said composition being in the form of a substantially dry powder; said polymeric ingredient being cationic when the composition contains swelling bentonite and anionic when the composition contains acid activated bentonite and said polymeric ingredient being present in an amount to substantially neutralize the charge on the bentonite contained in the composition whereby flocs containing the bentonite clay are formed when said composition is added to water.

2. The composition of claim 1 which further contains attapulgite clay and the polymeric ingredient is contained in the composition in an amount to substantially neutralize the charge on the bentonite and attapulgite clay contained in the composition whereby flocs containing the bentonite and attapulgite are formed.

3. The composition of claim 2 wherein the bentonite is swelling bentonite.

4. The composition of claim 2 wherein the polymeric ingredient is a flocculent selected from the group consisting of polyacrylamide, polyacrylamide/acrylic acid copolymer and polyacrylamide/acrylate copolymer.

5. The composition of claim 4 wherein the ratio of bentonite to attapulgite clay is at least 1.5 to 1.

6. The composition of claim 2 wherein the polymeric ingredient is a coagulant selected from the group consisting of polydiallyldimethyl ammonium chloride; quaternary condensation polymers of epichlorohydrin and dimethyl amine; and quaternary ammonium vinyl polymers.

7. The composition of claim 4 which further includes a binder and the powder is formed into a tablet.

8. The composition of claim 6 which further includes a binder and the powder is formed into a tablet.

9. A composition for purifying water which consists of 100 parts by weight of swelling bentonite; attapulgite clay in an amount up to about 67 parts by weight; zeolite in an amount up to about 100 parts by weight; activated charcoal in an amount up to about 100 parts by weight; biocide in an amount up to about 1.5 parts by weight and polymeric flocculent in an amount up to about 2.5 parts by weight; said biocide being selected from the group consisting of tetraglycine hydroperiodide and sodium dichloroisocyanurate; and said flocculent being selected from the group consisting of cationic polyacrylamide, cationic polyacrylamide/acrylic acid copolymer and cationic polyacrylamide/acrylate copolymer; and said composition being in the form of a substantially dry powder.

10. The composition of claim 9 which consists essentially of 100 parts by weight of swelling bentonite; 38.6 parts by weight of attapulgite clay; 100 parts by weight of zeolite; 38.6 parts by weight of activated charcoal; 1.04 parts by weight of biocide and .05 parts by weight of polyacrylamide.

11. The composition of claim 9 which further includes 25 parts by weight of binder and said composition is formed into a tablet.

12. A composition for purifying water which consists essentially of 100 parts by weight of acid activated bentonite; attapulgite clay in an amount up to about 67 parts by weight; zeolite in an amount up to about 67 parts by weight; $NaH_2PO_4$ in an amount up to about 2.4 parts by weight; $NaHCO_3$ in an amount up to about 60 parts by weight of; sodium dichloroisocyanurate in an amount up to about 8 parts by weight; polymeric flocculent in an amount up to about 2 parts by weight; and binder in an amount up to about 25 parts by weight; wherein said flocculent is selected from the group consisting of anionic polyacrylamide, anionic polyacrylamide/acrylic acid copolymer and anionic polyacrylamide/acrylate copolymer; and said composition is a substantially dry powder in the form of a tablet.

13. The composition of claim 12 which consists essentially of 100 parts by weight of acid activated bentonite; about 59.5 parts by weight of attapulgite clay; about 67 parts by weight of zeolite; about 2 parts by weight of $NaH_2PO_4$; about 4 parts by weight of $NaHCO_3$; about 6 parts by weight of sodium dichloroisocyanurate; about 0.4 parts by weight of polyacrylamide/acrylate copolymer and about 19.8 parts by weight of microcrystalline cellulose binder.

14. A composition for purifying water which consists essentially of 100 parts by weight of acid activated bentonite; silica gel in an amount up to about 62 parts by weight; biocide in an amount up to about 6.8 parts by weight; $NaHCO_3$ in an amount up to about 41 parts by weight; polymeric flocculent in an amount up to about 1.0 parts by weight; and binder in an amount up to about 55 parts by weight; wherein said flocculent is selected from the group consisting of anionic polyacrylamide, anionic polyacrylamide/acrylic acid copolymer and anionic polyacrylamide/acrylate copolymer and said biocide is selected from the group consisting of sodium dichloroisocyanurate and tetraglycine hydroperiodide and said composition is a substantially dry powder in the form of a tablet.

15. The composition of claim 14 which consists of 100 parts by weight of activated bentonite; about 49 parts by weight of silica gel; about 4.1 parts by weight of sodium dichloroisocyanurate; about 13.7 parts by weight of $NaHCO_3$; about 0.3 parts by weight of polyacrylamide/acrylate flocculant and about 13.7 parts by weight of sodium carboxymethyl cellulose binder.

16. A composition for purifying water which consists essentially of 100 parts by weight of acid activated bentonite; zeolite in an amount up to about 67 parts by weight; silica gel in an amount up to about 63 parts by weight; disodium pyrophosphate in an amount up to about 30 parts by weight; sodium dichloroisocyanurate in an amount up to about 5 parts by weight; polymeric flocculent in an amount up to about 0.25 parts by weight; $NaHCO_3$ in an amount up to about 38 parts by weight; and binder in an effective amount for forming the composition into a tablet; said flocculent being selected from the group consisting of anionic polyacrylamide, anionic polyacrylamide/acrylic acid copolymer and anionic polyacrylamide/acrylate copolymer; and said composition being a substantially dry powder in the form of a tablet.

17. A composition for purifying water which consists essentially of 100 parts by weight of swelling bentonite; attapulgite clay in an amount up to about 66 parts by weight; zeolite in an amount up to about 63 parts by weight; biocide in an amount up to about 5.7 parts by weight; polymeric flocculent in an amount up to about 5.7 parts by weight; disodium pyrophosphate in amount up to about 34.3 parts by weight; and binder; said binder being present in an amount effective for forming the composition into a tablet; said biocide being selected from the group consisting of tetraglycine hydroperiodide and sodium dichloroisocyanurate; said polymeric flocculent selected from the group consisting of cationic polyacrylamide, cationic polyacrylamide/acrylic acid copolymer and cationic polyacrylamide/acrylate copolymer; and said composition being a substantially dry powder in the form of a tablet.

18. The composition of claim 17 which consists essentially of 100 parts by weight of swelling bentonite; about 42.9 parts by weight of attapulgite clay; about 42.9 parts by weight of zeolite; about 4.3 parts by weight of biocide; about 5.7 parts by weight of polyacrylamide/acrylate copolymer; about 28.6 parts by weight of $NaHCO_3$; about 28.6 parts by weight of disodiumpyrophosphate and about 14.3 parts by weight of binder.

19. A composition for purifying water which consists essentially of 100 parts by weight of swelling bentonite; about 46.2 parts by weight of attapulgite clay; about 40 parts by weight of synthetic type A zeolite in sodium form; about 3.7 parts by weight of polydiallyldimethyl ammonium chloride; about 4.6 parts by weight of sodium dichoroisocyanurate; about 30.8 parts by weight of $NaHCO_3$; about 30.8 parts by weight of disodiumpyrophosphate; said composition being in the form of a substantially dry powder.

20. The composition of claim 19 in the form of a tablet; said composition additionally containing an effective amount of microcrystalline cellulose binder for forming the composition into a tablet.

21. A method of treating turbid contaminated water which comprises forming flocs in a container of water by dispersing the composition of claim 19 in the water; allowing the flocs to settle; and then separating the water from the flocs by means of decantation or filtration.

22. The method of claim 21 wherein the flocs are separated from the water by filtering the water containing the flocs through a filter having holes small enough to prevent the passage of the flocs therethrough and large enough to allow the turbidity to flow therethrough before treatment of the water.

23. A composition for purifying water, said composition formed by pretreating a dry solid powder with a liquid biocide; said powder being selected from the group consisting of swelling bentonite, acid activated bentonite, attapulgite clay, zeolite and mixtures thereof; drying the pretreated powder and then blending the powder with a polymeric flocculent or polymeric coagulant said polymeric flocculent and coagulant being cationic when the composition contains swelling bentonite and anionic when the composition contains acid activated bentonite.

24. The composition of claim 23 wherein the zeolite is first blended with a powder selected from the group consisting of swelling bentonite, acid-activated bentonite, attapulgite clay and mixtures thereof; wherein said blending is performed by tumbling the ingredients in a tumbler with ceramic balls or pellets contained therein to break up the zeolite to form a homogeneous powder mixture; said tumbling operation being conducted before the pretreatment step.

25. The composition of claim 23 wherein the polymeric coagulant has been sorbed onto the attapulgite clay by wetting the clay with an aqueous solution of polymeric coagulant and then allowing the solution to dry.

26. The composition of claim 1 wherein the biocide is sorbed into the bentonite, attapulgite or zeolite.

27. The composition of claim 2 wherein the polymeric material is sorbed on the attapulgite clay.

* * * * *

UNITED STATES PATENT AND TRADEMARK OFFICE
CERTIFICATE OF CORRECTION

PATENT NO. : 5,071,587

DATED : December 10, 1991

INVENTOR(S) : PERMAN, Craig

It is certified that error appears in the above-identified patent and that said Letters Patent is hereby corrected as shown below:

```
Title page, "27 claims" should read --22 claims--.
```

Signed and Sealed this

Thirteenth Day of October, 1992

Attest:

DOUGLAS B. COMER

Attesting Officer     Acting Commissioner of Patents and Trademarks

UNITED STATES PATENT AND TRADEMARK OFFICE
CERTIFICATE OF CORRECTION

PATENT NO. : 5,071,587

DATED : December 10, 1991

INVENTOR(S) : Perman, Craig

It is certified that error appears in the above-identified patent and that said Letters Patent is hereby corrected as shown below:

Cancel claims 23 through 27.

Title page, "27 claims" should read -- 22 claims --.

This certificate supersedes Certificate of Correction issued

October 13, 1992.

Signed and Sealed this

Twenty-sixth Day of January, 1993

Attest:

DOUGLAS B. COMER

*Attesting Officer*  *Acting Commissioner of Patents and Trademarks*